(No Model.)
T. C. THOMAS.
LEVELING INSTRUMENT.
No. 370,106. Patented Sept. 20, 1887.
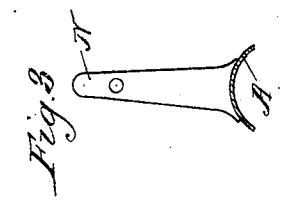
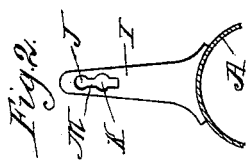
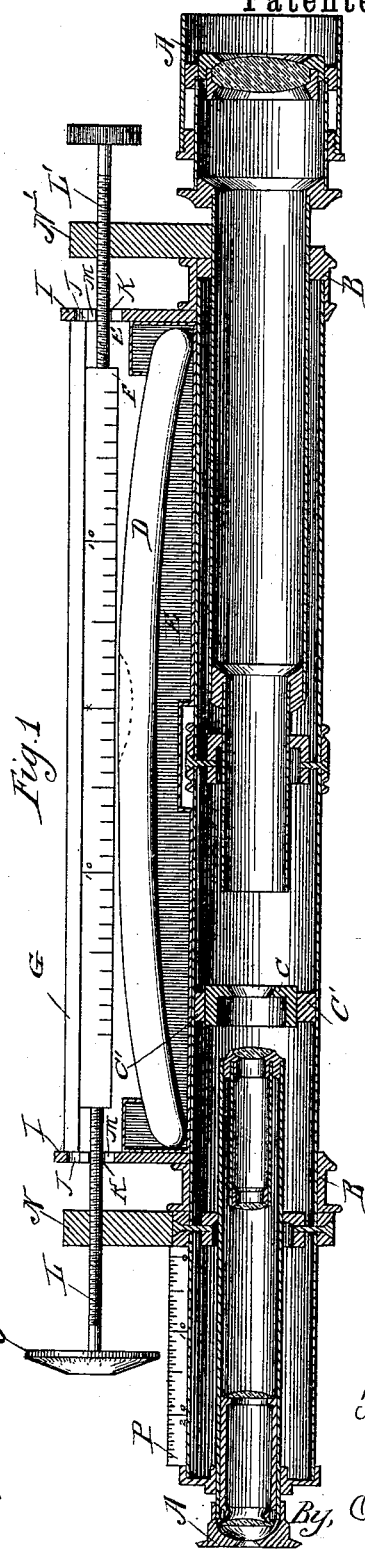
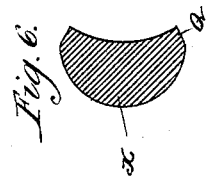
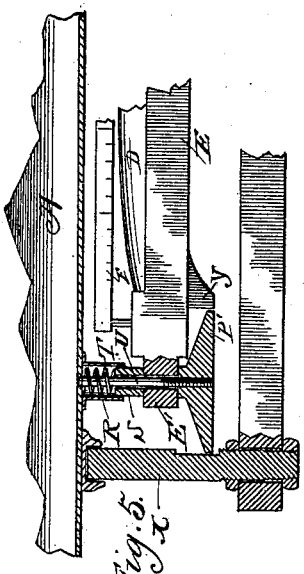
Witnesses,
Inventor,
Thomas C. Thomas
By, Offield Towle + Phelps
Att'ys.

UNITED STATES PATENT OFFICE.

THOMAS C. THOMAS, OF COLUMBIA, MISSOURI.

LEVELING-INSTRUMENT.

SPECIFICATION forming part of Letters Patent No. 370,106, dated September 20, 1887.

Application filed November 24, 1886. Serial No. 219,7 2. (No model.)

*To all whom it may concern:*

Be it known that I, THOMAS C. THOMAS, a citizen of the United States, residing at Columbia, in the county of Boone and State of Missouri, have invented a certain new and useful Improvement in Leveling-Instruments, which I desire to protect by Letters Patent of the United States, and of which the following is a specification.

The making of the various parts of measuring instruments adjustable, which has become the practice during recent years, although indispensable to great accuracy, is accompanied by disadvantages to which the old rigid instruments were not subject to any great extent. The parts, being movable, are more readily displaced by jars and the unavoidable rough usage of field-work, and these displacements are likely to be greater than those which occur in a rigid instrument. On the other hand, the advantage gained, which more than compensates for these defects, is that any displacement may be rectified in the field, which is of course ordinarily impossible with the displacements occurring in a rigid instrument. This liability to displacement in an instrument having movable parts has been heretofore particularly vexatious in leveling-instruments, for the reason that there have been provided no ready means for indicating to the operator the existence of the displacement, so that he may, without suspecting the slip, continue to use the misadjusted instrument, and thus obtain erroneous results. For this reason, in doing very careful work, it is frequently considered necessary to test all the adjustments of the instrument at each setting, which, as instruments have heretofore been made, is a process necessitating considerable loss of time.

It is the object of my present invention to so improve the common leveling-instrument now in use that it shall combine the advantages of the rigid instrument with those of the movable instrument, and avoid the disadvantages of both instruments; and this I propose to accomplish by attaching to those parts of the instrument which are made adjustable an index-scale, preferably in the form of a micrometer screw-head, on which the adjustment of these parts will be indicated by a certain known reading, so that the operator need only inspect his scale in order to ascertain the state of the instrument, and is not compelled to resort to the usual tedious tests for displacement. This construction also has the additional advantages that the displaced part may be returned to adjustment by direct setting on the scale without the necessity of resort to the usual cut-and-try process, and that in making the original adjustment the adjusting movement may be made by measurement instead of by guess-work and successive approximations. This micrometer-scale arrangement may be applied to several parts of the instrument; but it will be practically sufficient to make one part only movable and to apply the scale to that part alone, since if a permanent displacement of any of the fixed parts occurs it may be compensated in the field by a corresponding adjustment of the one movable part. It is well known that the cross-hair ring is less liable to displacement than the bubble-tube; and as the application of a micrometer-scale to it is more difficult than to the bubble-tube or the bubble-scale, I prefer to have the cross-hair ring fixed as regards its vertical position, and to depend for adjustment upon the bubble tube or scale. This adjustment may be obtained according to my invention either by fitting a micrometer scale to one end of the ordinary bubble-tube, or, as I believe to be preferable, by providing a fixed bubble-tube with a movable scale and micrometer attachments.

In the drawings annexed, forming a part of this application and illustrating my invention, Figure 1 is a vertical cross-section of the telescope-tube for a leveling-instrument to which my invention in one of its forms has been applied, the micrometer-scale being arranged in connection with a sliding bubble-scale. Figs. 2, 3, and 4 are details; and Figs. 5 and 6 show another form of my invention, in which the micrometer-scale is arranged in connection with the bubble-tube.

The telescope A A is of the usual construction, the Y-collars being shown at B B and the cross hair ring at C. The latter has no vertical movement, but may have a horizontal adjustment, if desired, in the guides C'. I do not, however, confine myself to the use of a cross-hair ring fixed vertically, as, if desired, it may be provided with the usual vertical adjusting-screws. I believe this, however, to be unnecessary for ordinary work. The bubble-tube D is permanently fixed in the casing E, and the bubble-scale F (shown in cross-section in Fig. 4) is adapted to slide in a guide-piece, G, the upper edge of the scale having a bead, H, fitting into said guide-piece, by which the scale is suspended. This guide-piece is attached at its ends to standards I, fixed to the telescope-tube, these standards being provided with circular holes J, for receiving the bead of the scale, circular holes K, for receiving the screws L L', which bear against the ends of the scale and hold it in place, and slots M, for receiving the scale itself, the holes J and slots M permitting the scale to have a greater range of movement than it would have were it arrested by the standards. The screws L and L' are fixed in standards N N', attached to the telescope-tube. On the forward end of the screw L is fixed a graduated micrometer-head, O, and beneath it, on the telescope-tube, is placed a scale, P, graduated to measure the revolutions of the head O. I consider it best to make the bubble-tube longer than in the ordinary instrument in order to give the bubble greater range.

The first adjustment may be most readily effected by leveling the line of collimation—say by the peg method—and then adjusting the scale to bisect the bubble by means of the screws L L'. The instrument will now be ready for use, with obviously less trouble than usually expended in making the first adjustment. The reading of the micrometer scale and head should be noted and recorded and checked at each resetting of the instrument. Any displacement will thus be indicated and may be rectified by resetting the scale to the recorded micrometer reading. It should be observed that one of the screws, L', might be replaced by a spring bearing against the end of the scale, which would perform its function in perhaps a more convenient manner. The adjustment may also be effected, it will be apparent, by first adjusting the line of collimation to the bottoms of the collars, (in case the cross-hair ring is adjustable,) and then adjusting the bubble-scale so that the reading of the bubble will not be changed by reversing the telescope in the Y's, and in this the use of the micrometer-scale would materially facilitate the attainment of adjustment, since it would enable the operator to measure the amount of movement given to the scale, as above suggested, the value of the divisions of the bubble-scale F in terms of the micrometer-scale P being known. This is an advantage possessed by the form of my invention having the sliding scale over the modification shown in Figs. 5 and 6, which will now be described. In this modification the several parts of the instrument are made in the ordinary form, with the exception that one end of the bubble-case E is provided, in place of the ordinary double nuts, with a graduated micrometer-screw head, P', a vertical scale, Q, being formed on the Y. A projection, E', from the end of the bubble-casing rests upon the screw-head P, and is pressed against it by a spring, R, and tap S, the spring and tap being fitted within the guide-cylinder T, the several parts being held in place by the pin U, attached to the telescope-tube, on the lower end of which the screw-head P' is threaded. It will be obvious that the spring and tap might be replaced by a second nut threaded on the pin U. The Y x, contiguous to the graduated head P', may be shaped to receive it, as shown in Fig. 6, in order to permit the diameter of the screw-head to be increased. Either of its flat surfaces may be graduated to form the scale Q, and the inner edge of the scale may be used as an index for the micrometer-head instead of the projection Y, Fig. 1, which is also adapted for that purpose.

I wish it understood that I do not confine myself to any particular form of micrometer-screw head, nor special means for applying the same to a leveling-instrument, as endless modifications in the details of construction might be devised by any skillful mechanic. My invention lies, broadly, in the application of a registering-scale of sufficient delicacy for the purpose to the bubble-scale, the bubble-tube, or any other adjustable part of a leveling-instrument in such a manner as to register displacement thereof.

Having thus described my invention, what I claim, and desire to protect by Letters Patent, is—

1. In a leveling-instrument, the combination of a telescope-tube, a bubble-tube, a bubble-scale, a micrometer-scale, and a micrometer-screw therefor actuating the bubble-scale, whereby the adjustment of the bubble may be made and the relative positions of the parts indicated, substantially as and for the purpose set forth.

2. In a leveling-instrument, the combination of a telescope-tube, a fixed bubble-tube, a sliding scale, and suitable means for adjusting said scale with reference to the bubble, substantially as and for the purpose set forth.

3. In a leveling-instrument, the combination of a telescope-tube, a fixed bubble-tube, a bubble-scale adjustably mounted with reference to the bubble-tube, and a micrometer-scale for measuring and indicating the relative positions of the scale and bubble-tube, substantially as and for the purpose set forth.

4. In a leveling-instrument, the combination of a telescope-tube, a fixed bubble-tube, a bubble-scale movable in the direction of the length of the bubble-tube, screw L, micrometer-head O, and micrometer-scale P, substantially as and for the purpose set forth.

5. The combination of the scale F, provided with bead H, guide-piece G, and screw L, substantially as and for the purpose set forth.

THOMAS C. THOMAS.

Witnesses:
C. V. MERSEREAU,
BATHURST SMITH.